UNITED STATES PATENT OFFICE.

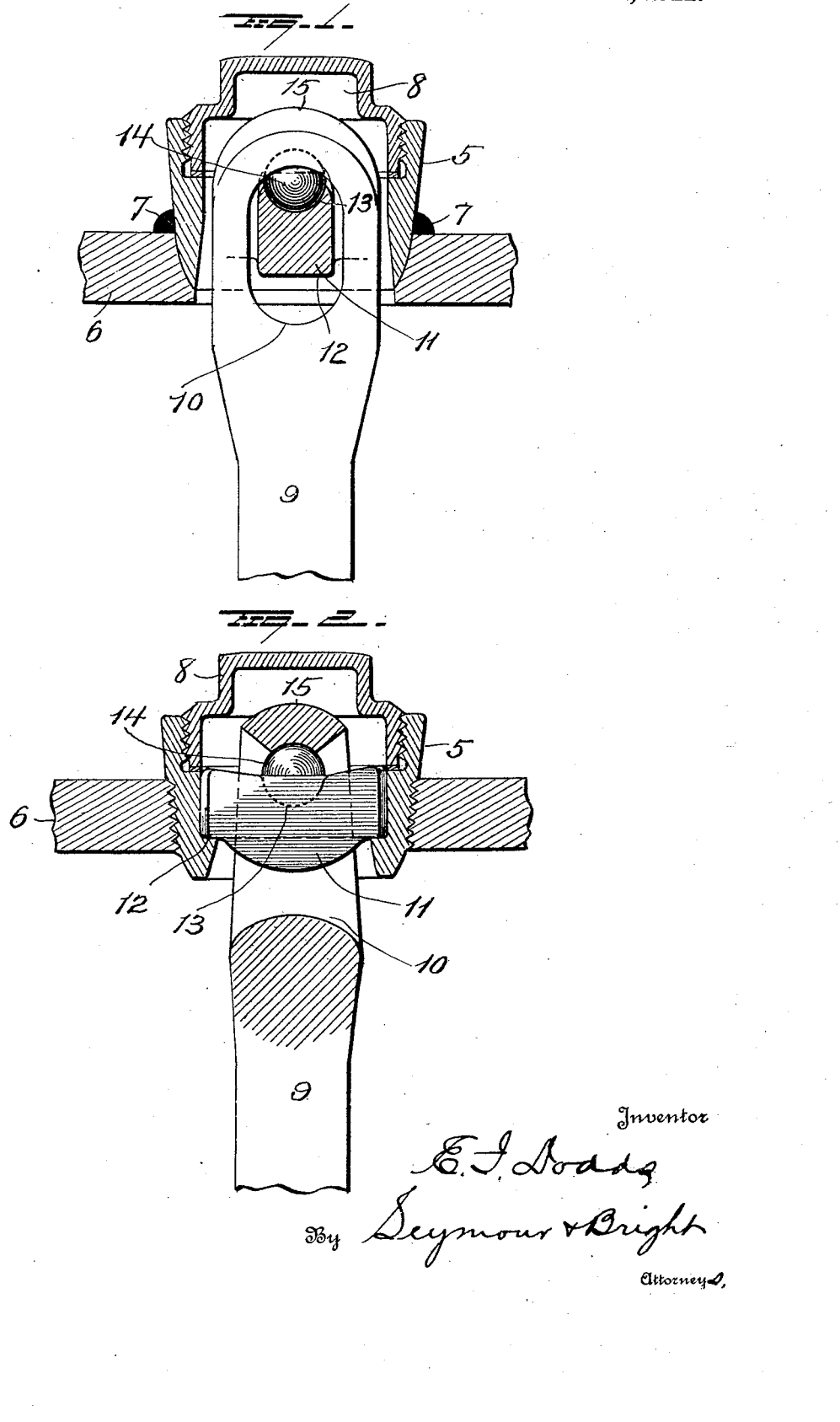

ETHAN I. DODDS, OF CENTRAL VALLEY, NEW YORK, ASSIGNOR TO FLANNERY BOLT COMPANY, OF PITTSBURGH, PENNSYLVANIA.

STAY-BOLT STRUCTURE.

1,410,006.

Specification of Letters Patent. Patented Mar. 21, 1922.

Application filed February 16, 1921. Serial No. 445,460.

*To all whom it may concern:*

Be it known that I, ETHAN I. DODDS, a citizen of the United States, and a resident of Central Valley, in the county of Orange and State of New York, have invented certain new and useful Improvements in Stay-Bolt Structures; and I do hereby declare the following to be a full, clear, and exact description of the invention, such as will enable others skilled in the art to which it appertains to make and use the same.

My invention relates to an improvement in stay bolt structures and it consists in a bolt bearing member adapted for attachment to a boiler sheet, a bolt having a link shaped end, a cross bar carried by the bearing member and a sphere carried by the cross bar and forming a support for the bolt whereby the latter is free to move to accommodate itself to the movements of the boiler sheets to which it may be applied.

In the accompanying drawings, Figure 1 is a view in cross section of a bolt bearing member and bolt carried thereby and Figure 2 is a similar view of a modified form at right angles to that shown in Figure 1.

5 represents a bearing member or sleeve which in Figure 1 is shown with a curved inner end seated within a curved seat in the outer sheet 6 of the boiler and welded thereto as at 7, whereas in Figure 2 I have shown the sleeve threaded for attachment to the sheet, the manner of securing the sleeve or bearing member to the sheet being immaterial. The bearing member 5 is hollow and threaded preferably internally at its outer end for the attachment of the cap 8 which closes the outer end of said bearing member.

9 is the stay bolt adapted for attachment to the inner sheet (not shown) of the boiler in the usual and well known manner and flattened and enlarged at its outer end its flattened end being provided with an eye 10 for the passage of the cross bar 11. This bar is preferably loosely mounted at its ends in recessed seats 12 formed within the sleeve or bearing member 5 and is of such length that it is held from endwise movement and can only be removed through the outer open end of said bearing member. It is preferably bowed as shown in Figure 2 and is provided centrally in its upper face with a semi-spherical seat 13 in which the hard sphere or ball 14 is loosely seated. The cross bar 11, as previously stated passes through the eye 10 of the bolt 9 and the upper member 15 of the eye 10 is provided on its inner face with a curved seat to engage the sphere 14. The seat in the upper member 15 of the eye 10 is less than a half sphere so that the said upper member will be supported wholly on the sphere 14 and out of contact with the cross bar so that there will be no direct contact between the upper member 15 of the eye of the bolt and the cross bar during any of the normal movements of the bolt due to the unequal contraction or expansion, or other movements of the two sheets of the boiler.

In applying the bolt to the inner sheet, if the cross bar be seated at its ends in recessed seats as shown in Figure 1,—the bolt may be turned by the application of a wrench or other tool directly to the bearing member or to the cross bar. If however the bolt be secured to the inner sheet of the boiler by upsetting the end of the bolt against the outer face of the inner sheet, the bolt may be driven into the latter by force applied to the member 15 of the bolt.

The bolt as shown is suspended for universal movement on the cross bar 11 and is free to elongate or move longitudinally, the cap 8, in addition to forming a closure for the bearing member also forms a stop or abutment for taking excessive collapsing stresses and is freely removable to permit of the ready inspection of the bolt at all times.

It is evident that many slight changes might be resorted to in the relative arrangement of parts shown and described without departing from the spirit and scope of my invention hence I would have it understood that I do not wish to confine myself to the exact construction and arrangement of parts shown and described but, Having fully described my invention what I claim as new and desire to secure by Letters-Patent, is:—

1. In a staybolt structure, the combination of a bearing member, a bolt having an eye at its outer end, a cross bar independent of the bolt and passing through said eye and loosely supported at its ends by the bearing member, and a convex bearing carried by the cross bar and forming a bearing for the outer end of the bolt.

2. In a stay bolt structure, the combination of a bearing member, a bolt having an eye at its outer end, a cross bar independent of the bolt and bearing and carried by the latter and passing through the eye and a ball bearing carried by the cross bar and carrying the bolt.

3. In a staybolt structure, the combination of a bearing member, a bolt having an eye at its outer end, a bowed cross bar independent of the bearing member and bolt and supported at its ends on the former and a ball carried by said bowed cross bar and forming a bearing for the bolt, the said cross bar passing through the eye of the bolt.

In testimony whereof, I have signed this specification in the presence of a subscribing witness.

ETHAN I. DODDS.

Witness:
EDWIN S. RYCE.